(12) United States Patent
Kim et al.

(10) Patent No.: US 6,925,113 B2
(45) Date of Patent: Aug. 2, 2005

(54) RAIN ATTENUATION COMPENSATION METHOD USING ADAPTIVE TRANSMISSION TECHNIQUE AND SYSTEM USING THE SAME

(75) Inventors: Soo Young Kim, Taejon (KR); Kwang Jae Lim, Taejon (KR); Tae Gon Kwon, Taejon (KR); Hyoung Soo Lim, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 791 days.

(21) Appl. No.: 09/875,351

(22) Filed: Jun. 5, 2001

(65) Prior Publication Data

US 2002/0058505 A1 May 16, 2002

(30) Foreign Application Priority Data

Oct. 11, 2000 (KR) ........................................ 2000-59780

(51) Int. Cl.$^7$ ............................ H04B 11/00; H04B 1/00; H04B 7/185
(52) U.S. Cl. .......................... 375/227; 455/69; 370/318
(58) Field of Search ................................ 375/227, 262; 340/146; 370/206, 324, 535; 455/427, 69

(56) References Cited

U.S. PATENT DOCUMENTS

| | | | |
|---|---|---|---|
| 4,047,151 A | * 9/1977 | Rydbeck et al. | 714/774 |
| 4,261,054 A | * 4/1981 | Scharla-Nielsen | 455/13.4 |
| 4,301,533 A | 11/1981 | Acampora et al. | 370/104 |
| 4,309,764 A | 1/1982 | Acampora | 370/83 |
| 4,731,866 A | 3/1988 | Muratani et al. | 455/9 |
| 4,837,786 A | 6/1989 | Gurantz et al. | 370/20 |
| 4,899,350 A | * 2/1990 | Kage | 375/279 |
| 6,359,934 B1 | * 3/2002 | Yoshida | 375/262 |
| 6,452,964 B1 | * 9/2002 | Yoshida | 375/222 |

* cited by examiner

Primary Examiner—Amanda T. Le
Assistant Examiner—Cicely Ware
(74) Attorney, Agent, or Firm—Seed IP Law Group PLLC

(57) ABSTRACT

A rain attenuation compensation method that includes estimating a signal-to-noise (S/N) ratio from PSK-modulated receiving signal at a receiving end; predicting a signal-to-noise (S/N) ratio of the next time point on the basis of the signal-to-noise (S/N) ratio values of the past and present time points; and determining which of transmission methods is adequate to the predicted signal-to-noise (S/N) ratio of the next time point. If the switching of the transmission method is determined, a control signal for inquiring the change of the transmission method is transmitted to a transmitting and a receiving end. Data is then transmitted by the switched transmission method.

21 Claims, 16 Drawing Sheets

BER : BIT ERROR RATE
Es/No : SYMBOL ENERGY-TO-NOISE RATIO
4SR BPSK : 4 SYMBOL REPETITION BPSK
2SR BPSK : 2 SYMBOL REPETITION BPSK

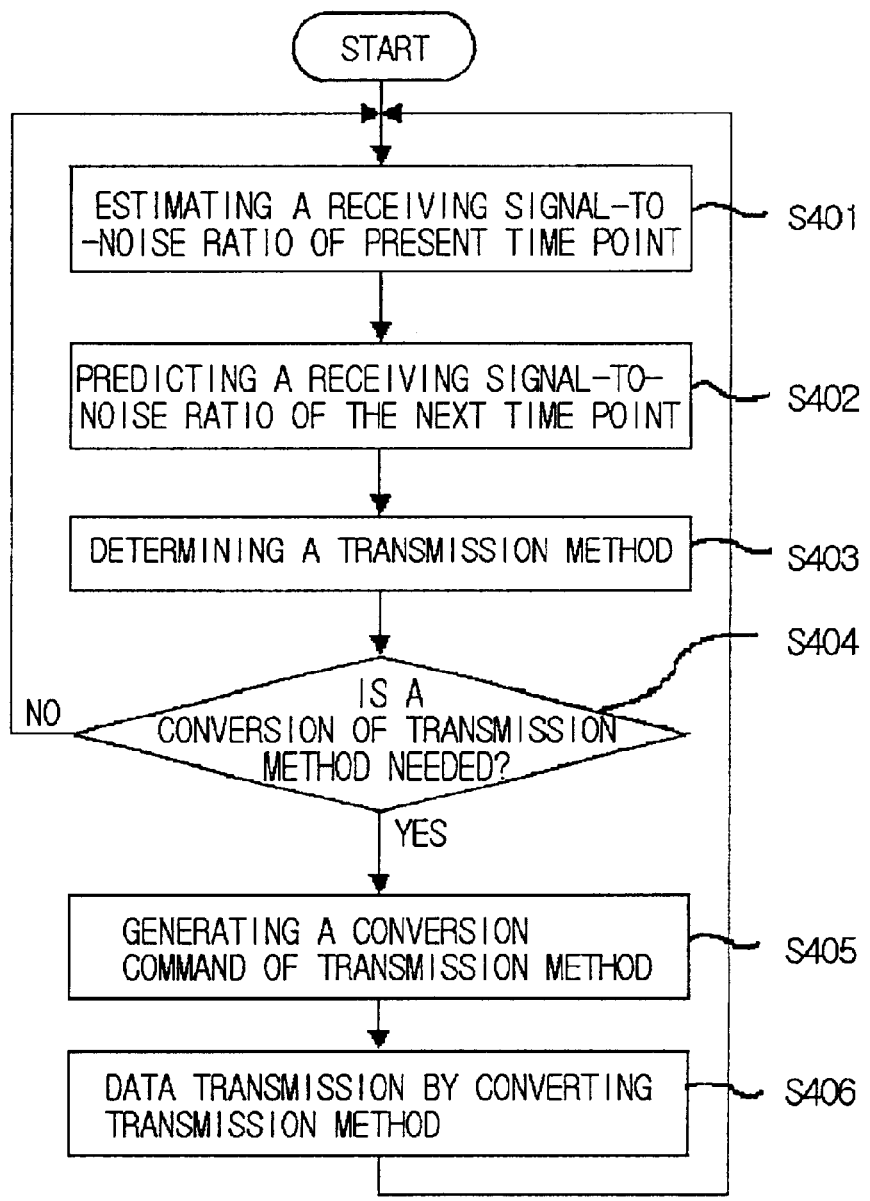

BPSK REAL PART

BPSK IMAGINARY PART

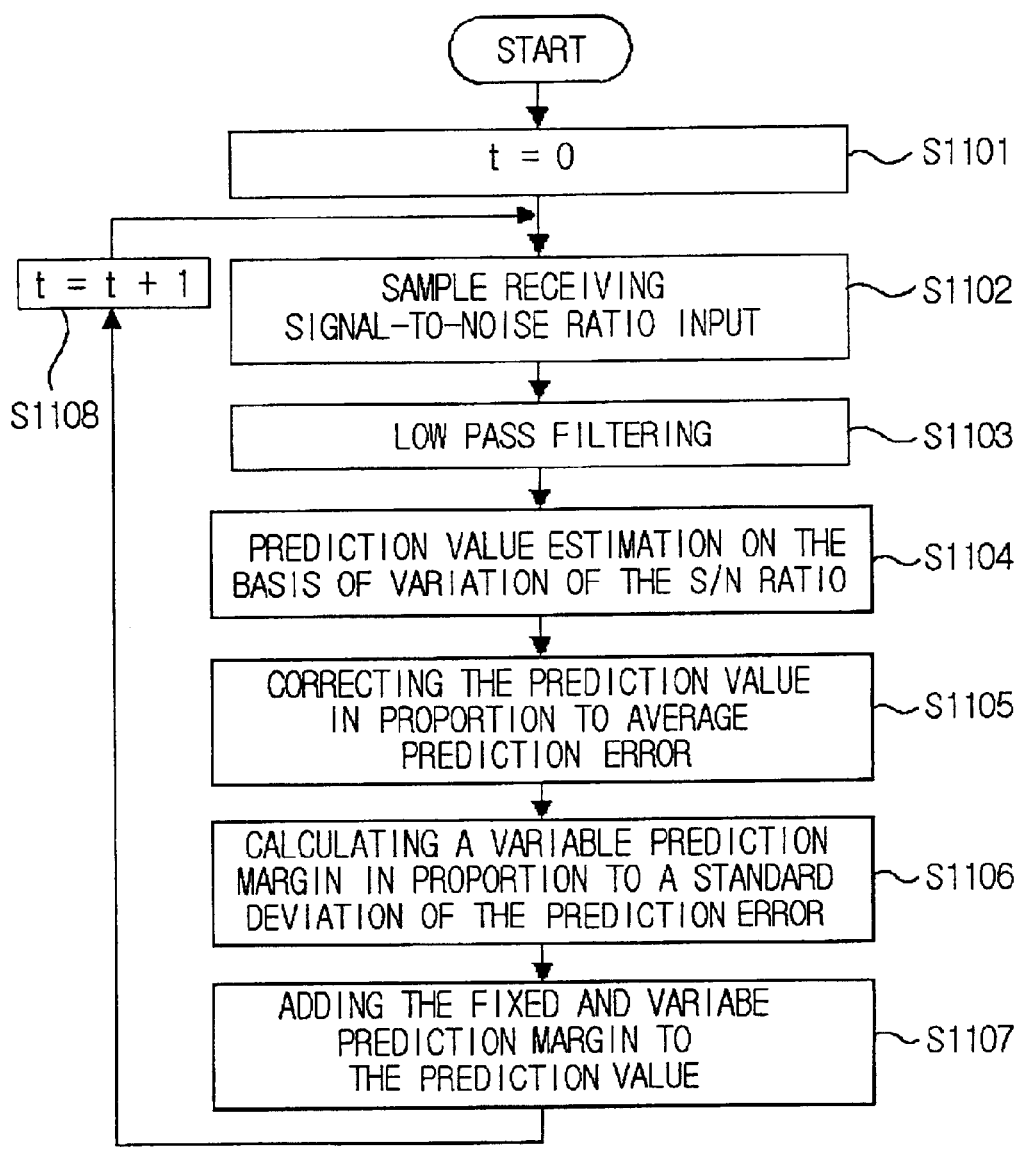

RAIN ATTENUATION COMPENSATION METHOD USING ADAPTIVE TRANSMISSION TECHNIQUE AND SYSTEM USING THE SAME

TECHNICAL FIELD

The present invention relates to a rain attenuation compensation method in a satellite communication system and an apparatus using the same. More particularly, it relates to a rain attenuation compensation method in a satellite communication system using a high frequency band over Ku-band, which uses an adaptive transmission technique, measures/predicts the quality of a received signal, and allocates a transmission technique proper to a present rain attenuation value. The invention also relates to a satellite communication system employing a rain attenuation compensation method using the adaptive transmission technique.

BACKGROUND OF THE INVENTION

In general, conventional rain attenuation compensation methods mainly use either power control techniques or diversity techniques. In recent times, new techniques have been developed to compensate rain attenuation by using an adaptive transmission technique.

The rain attenuation compensation methods using the power control techniques are disclosed in U.S. Pat. Nos. 4,261,054 and 4,731,866, which amplify signal powers by a degree of signal attenuation if signal attenuation occurs due to rain. But, the prior arts should include a high power amplifier for supplementing the power margin at the time when the system is designed, and thus causes economical inefficiency.

Another rain attenuation compensation method using the diversity techniques requires to install additional earth station, additional frequency band or satellite according to the kinds of diversity, and therefore causes even serious economical problems.

Rain attenuation compensation methods using adaptive transmission techniques are disclosed in U.S. Pat. Nos. 4,309,764, 4,301,533, 4,837,786, and 4,047,151, that describe a method for allocating a spare time slot to either a user or earth station experiencing excessive attenuation in TDMA (Time Division Multiple Access) technique, a method for reducing data transmission rate in case of excessive attenuation, or a method for enhancing error correction capability by providing spare redundancies in a coding method. These methods mainly use a very basic and simple method for compensating rain attenuation, so that the compensation range is limited and efficiency of rain attenuation compensation is also limited. In addition, these methods do not provide a detailed method for allocating a proper transmission method by estimating rain attenuation and then predicting attenuation at the next sampling time.

SUMMARY OF THE INVENTION

Accordingly, the present invention is directed to a rain attenuation compensation method using an adaptive transmission technique and a system using the same that substantially obviates one or more of the problems due to limitations and disadvantages of the related art.

It is an object of the present invention to provide a rain attenuation compensation method and an apparatus for the same, which uses both an adaptive coding/decoding method using a block turbo code and an adaptive modulating/demodulating method using M-ary PSK (Phase-Shift Keying) modulation method as an adaptive transmission method, estimate a signal-to-noise (S/N) ratio from a PSK-modulated received signal at a receiving end, predict S/N ratio at the next time point by using the estimated S/N ratio, allocate the most appropriate transmission method, and thus obtain an economical and maximal transmission efficiency.

To achieve these and other advantages and in accordance with the purpose of the present invention, as embodied and broadly described, a rain attenuation compensation method in a satellite communication system including a transmission end having a plurality of transmission methods comprised of a combination of an adaptive coding method and an adaptive modulation method, a receiving end having a plurality of receiving methods comprised of a combination of an adaptive decoding method and an adaptive demodulation method, and a controller for estimating/predicting a signal-to-noise (S/N) ratio and controlling both a transmission method and a transmission power of the transmission end and a receiving method of the receiving end, the rain attenuation compensation method for the controller includes the steps of:

estimating a signal-to-noise(S/N) ratio of present time point, and predicting a signal-to-noise(S/N) ratio of the next time point;

determining a transmission method which is adequate to the predicted signal-to-noise (S/N) ratio of the next time point; and generating a control signal for requesting the change of the transmission method and transmission power of the transmission end and the receiving method of the receiving end according to the determined transmission method, and transmitting/receiving a data through the changed transmission method.

According to the present invention, a recording media is provided, which is readable by a computer recording a program for executing a rain attenuation compensation method using the aforementioned adaptive transmission method.

In another aspect, a satellite communication system includes:

a transmission end comprising a plurality of transmission methods composed of the combination of an adaptive coding and an adaptive modulation;

a receiving end comprising a plurality of receiving methods composed of a combination of an adaptive decoding and an adaptive demodulation; and a controller which estimates a signal-to-noise (S/N) ratio of the signal received at the receiving end, predicts a signal-to-noise (S/N) ratio at the next time point, determines which of transmission methods is adequate to the predicted signal-to-noise (S/N) ratio of the next time point, controls both the transmission method and transmission power of the transmission end and the receiving method of the receiving end so as to allow the transmission end and the receiving end to transmit/receive the data through the determined transmission method, and adaptively controls the transmission method according to the signal-to-noise (S/N) ratio.

Additional features and advantages of the invention will be set forth in the description which follows, and in part will be apparent from the description, or may be learned by practice of the invention. The objectives and other advantages of the invention will be realized and attained by the scheme particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The embodiments of the present invention will be explained with reference to the accompanying drawings, in which:

FIG. 4 is a flowchart illustrating a rain attenuation compensation method using the adaptive transmission technique according to a preferred embodiment of the present invention;

FIG. 11 is a flowchart illustrating a step for predicting, a signal-to-noise ratio of the next time point shown in FIG. 4.

DETAILED DESCRIPTION OF THE INVENTION

Figure 1A:
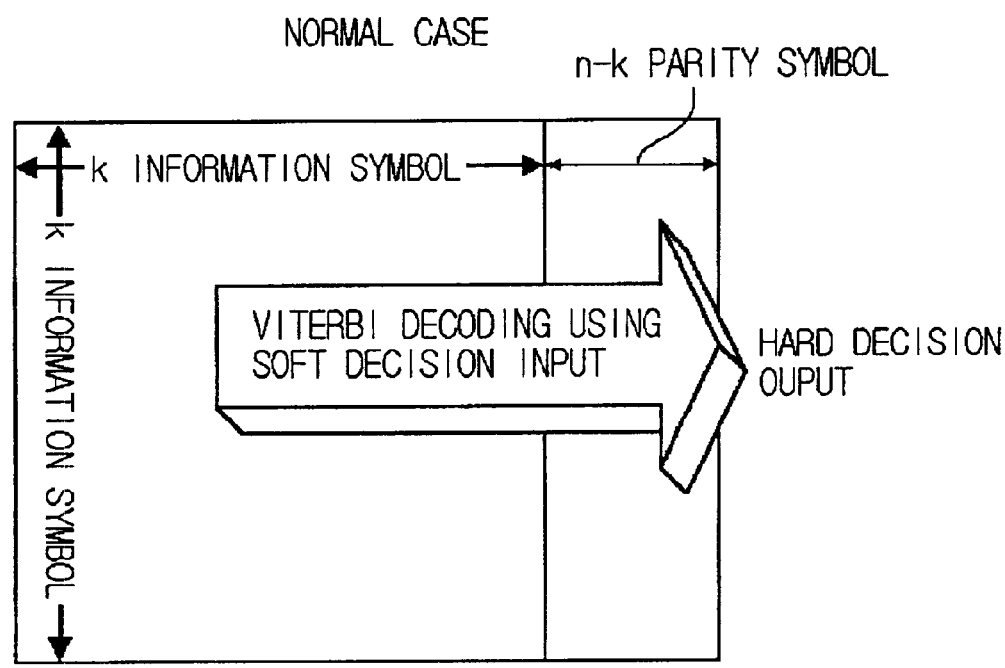
FIG. 1 shows a method for an adaptive coding/decoding using a block turbo code.

Reference will now be made in detail to the preferred embodiments of the present invention, examples of which are illustrated in the accompanying drawings.

A rain attenuation compensation method using the adaptive transmission technique according to a preferred embodiment of the present invention will now be described in detail.

In case of compensating rain attenuation by using an adaptive transmission technique in a satellite communication system using a high frequency band over Ku-band, the rain attenuation compensation method according to the present invention uses an adaptive coding/decoding method using a block turbo code and M-ary PSK adaptive modulation/demodulation method as an adaptive transmission technique.

In the adaptive coding/decoding method using a block turbo code, two kinds of methods are employed to adjust the coding gain according to the quantity of attenuation. The related detailed description is disclosed in the article "Adaptive Coding/Decoding Method in Satellite Communication System using Block Turbo Code" published by Soo Young, KIM et al. in *JCCI* 2000, volume 1 at pp. 419–422.

FIG. 1 shows a method for an adaptive coding/decoding using a block turbo code. Referring to FIG. 1, in order to employ a linear block code where the length of information word is 'k' and the length of a code word is 'n', an information frame comprised of $k^2$ bits is constructed. In a normal case, as to the information frame having $k^2$ bits, a general block coding method for sequentially performing k-times block coding operations for k bits is employed to transmit a plurality of coding frames of nk. With respect to a plurality of received signal frames of nk, soft decision Viterbi decoding methods are sequentially performed for k-times as to the block code of n received signals at a time, thereby restoring a plurality of information bit frames of $k^2$.

In addition, if it is determined that additional coding gain is needed because of an excessive attenuation, as to the information frame composed of $k^2$ bits, block coding operations of k-times for k bits are sequentially performed for each row, and block coding operations of k-times for k bits are sequentially performed for each column, therefore, bits of $(2nk-k^2)$ are transmitted. In case of decoding, an iterative decoding method using a soft decision output Viterbi algorithm is employed. In this case, there are several advantages that the same coding construction is used and only a little modification of the decoding method is needed at the receiving end.

Adaptive transmission technique using M-ary PSK modulation method properly allocates 8-PSK, QPSK (Quadrature Phase Shift Keying), BPSK and a symbol repetition BPSK according to the quantity of attenuation. That is, in case of the lowest attenuation, 8-PSK modulation method having the lowest efficiency in a power gain aspect and a superior frequency efficiency is employed. As the attenuation gradually increases, other methods having higher power gain, such as QPSK or BPSK method, are selectively employed.

Figure 2:
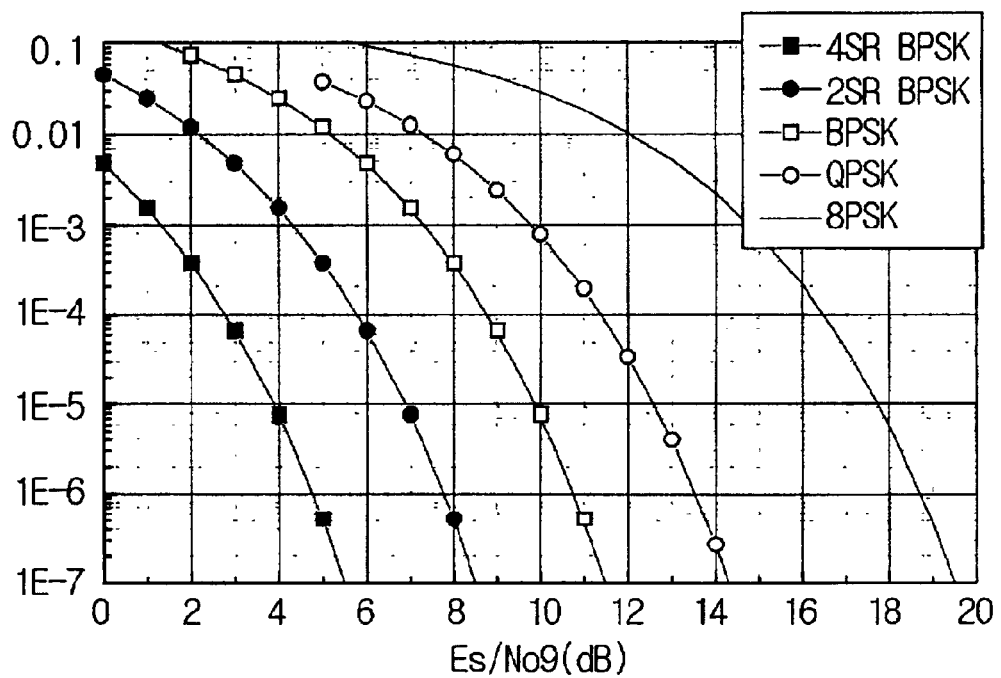
FIG. 2 shows bit error rate performance of M-ary PSK modulation method.

FIG. 2 is a graphical representation of the bit error rate (BER) of M-ary PSK modulation method. For example, assuming that a bit error rate performance required to a system is $10^{-6}$, if 8-PSK modulation method is switched to QPSK method, about 5 dB power gain can be obtained. In other words, if the system employs 8-PSK method in a normal case and signal attenuation over 5 dB occurs, the system will change the modulation method to QPSK. At this time, there is no damage in the total link performance. In this manner, if the signal attenuation gradually increases, the QPSK method is sequentially switched to BPSK, 2 SR (Symbol Repetition) BPSK, and 4 SR BPSK.

Figure 1B:
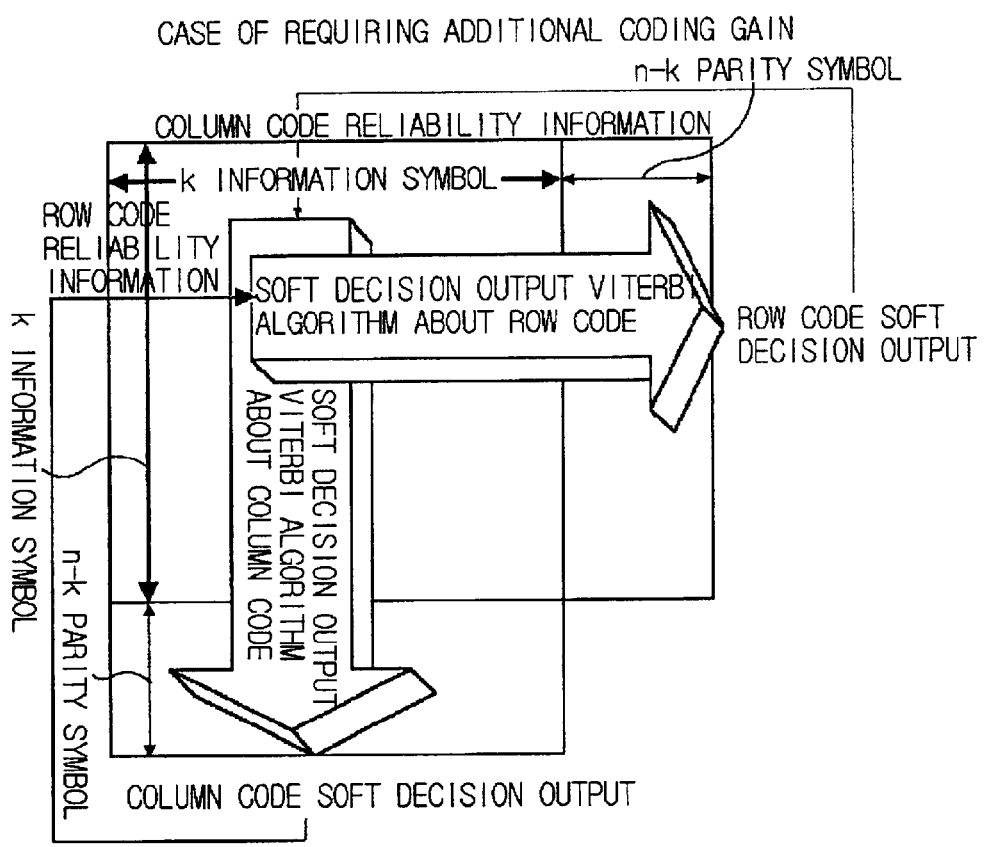

This concept is applied to an adaptive coding method in the same manner. That is, in a normal case, a method shown in FIG. 1(a) is employed. If a signal attenuation gradually increases, other method as shown in FIG. 1(b) requiring less power is employed in order to maintain the bit error rate (BER) performance instead of the method of FIG. 1(a).

Figure 3:
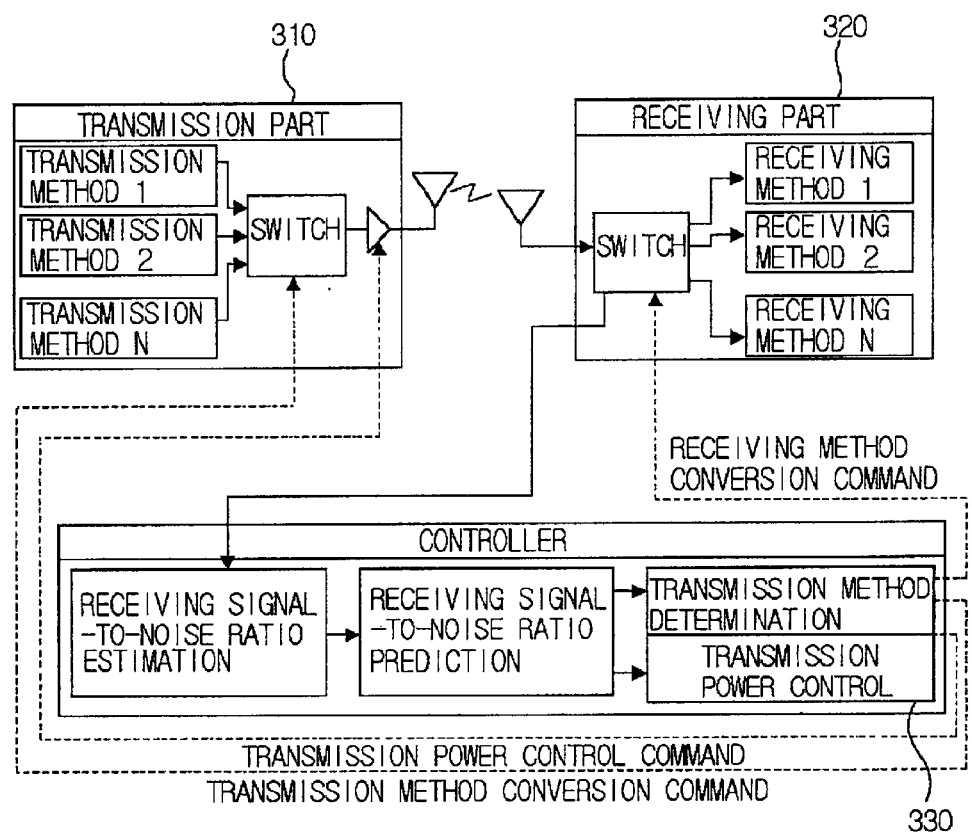
FIG. 3 is a block diagram of a satellite communication system using a rain attenuation compensation method using the adaptive transmission technique according to a preferred embodiment of the present invention.

FIG. 3 is a block diagram of a satellite communication system according to the present invention. Referring to FIG. 3, the satellite communication system includes a transmission part 310 comprising N transmission methods composed of a combination of an adaptive coding method using a block turbo code and M-ary PSK modulation methods, a receiving part 320 comprising N receiving methods composed of a combination of an adaptive decoding method using a block turbo code and M-ary PSK demodulation methods, and a controller 330 for controlling the transmission method and transmission power of the transmission part 310 and the receiving method of the receiving part 320 by estimating/predicting a receiving signal-to-noise (S/N) ratio and determining an adequate transmission/reception method. The rain attenuation compensation method using an adaptive transmission technique according to the present invention is made in the controller 330.

FIG. 4 is a flowchart illustrating a rain attenuation compensation method using an adaptive transmission technique according to a preferred embodiment of the present invention. Referring to FIG. 4, a controller 310 estimates (S401) the signal-to-noise (S/N) ratio of the present time point on the basis of received M-ary PSK modulation signal, predicts (S402) the signal-to-noise (S/N) ratio of the next time point on the basis of the estimated received signal-to-noise value at the past and present time points. The controller 310 determines (S403) a transmission method proper to the next time point on the basis of the predicted signal-to-noise (S/N) ratio, compares the determined transmission method with a transmission method of the present time point, determines (S404) whether a transmission method should be changed or not, and thus generates (S405) a transmission method switching command. According to the transmission method switching command, the transmission part 310 and the receiving part 320 change the transmission method and the receiving method, and then transmit a data in the step S406.

Figure 5A:
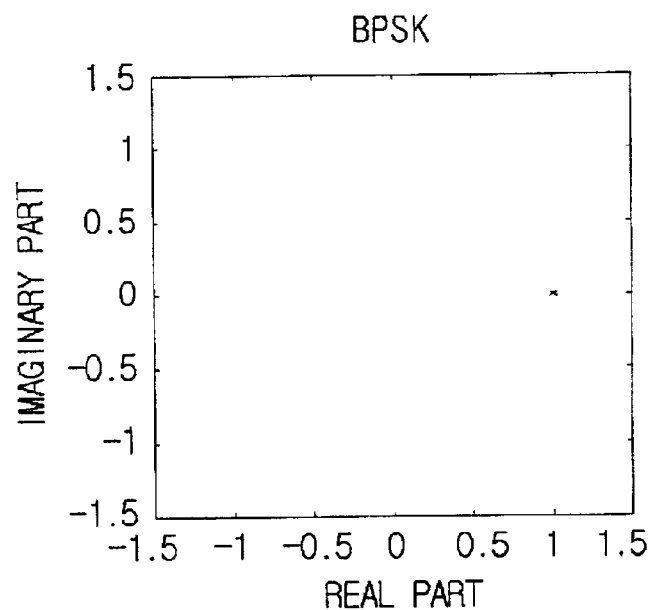
FIG. 5 shows M-ary PSK signal constellation in a noise-free channel environment.
Figure 5B:
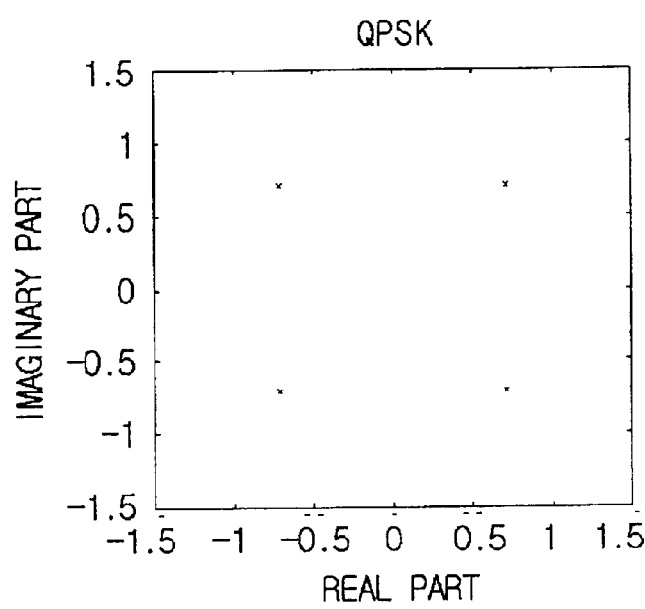
Figure 5C:
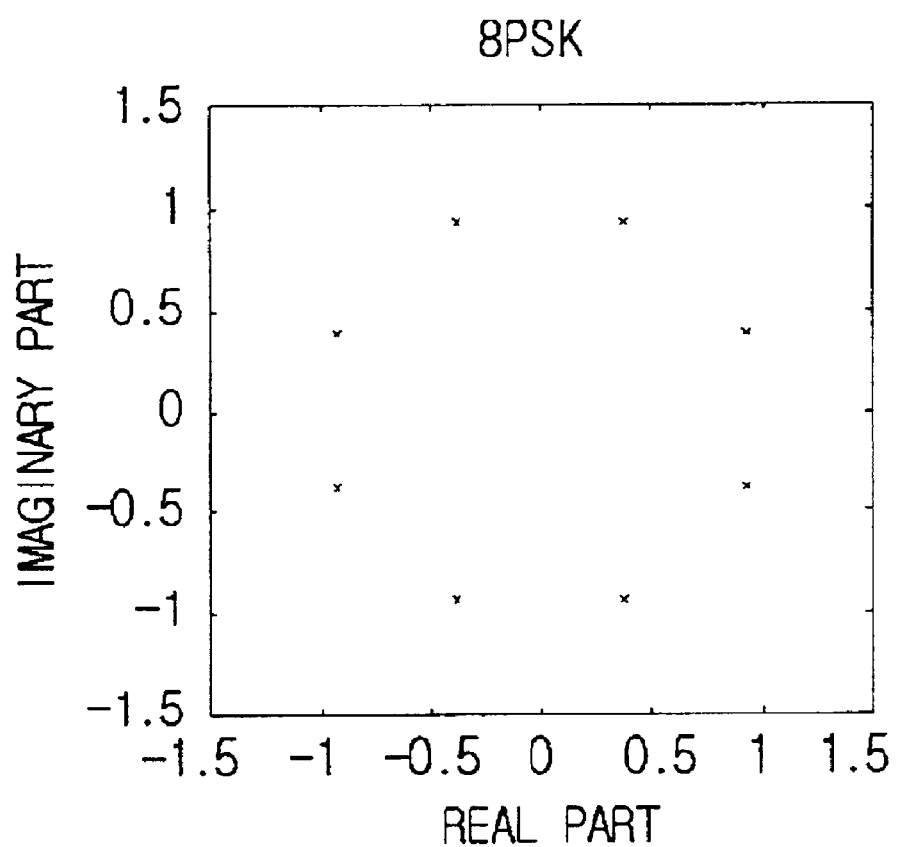
Figure 6:
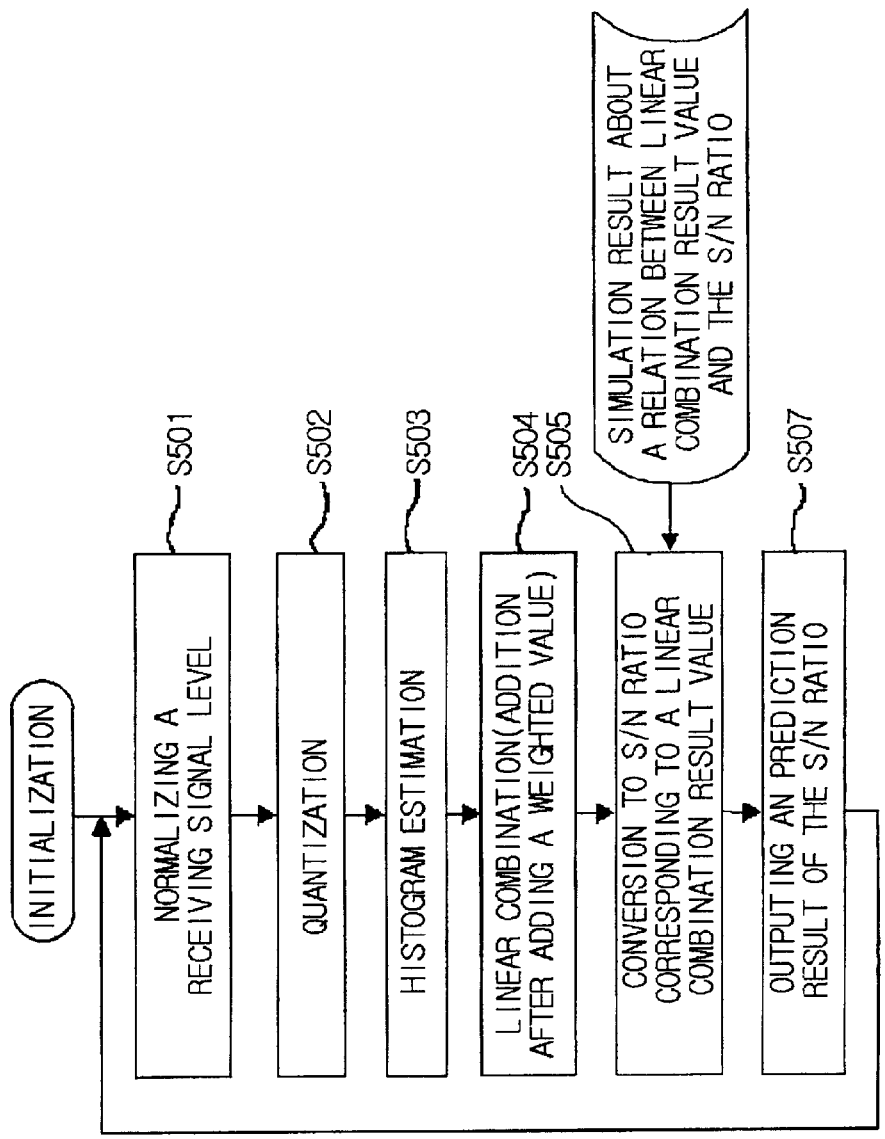
FIG. 6 shows a method for estimating a received signal-to-noise (S/N) ratio shown in FIG. 4.
Figure 7A:
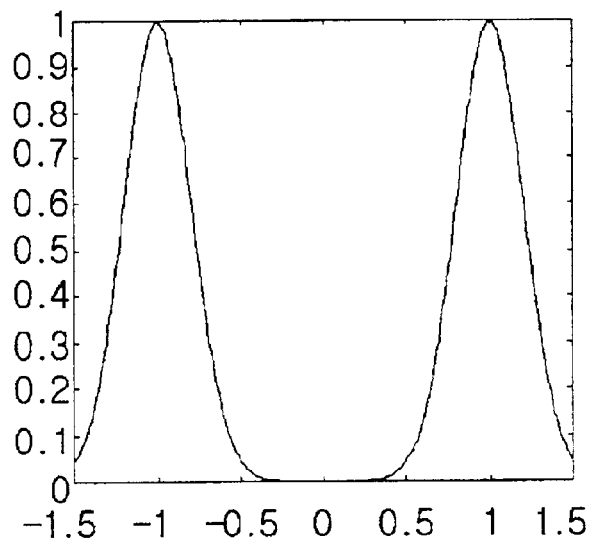
FIG. 7 shows a probability density function of M-ary PSK signal in a noisy channel environment.
Figure 7B:
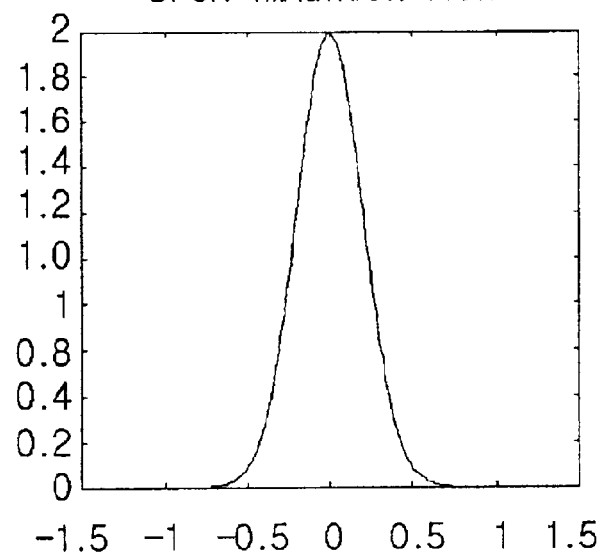
Figure 7C:
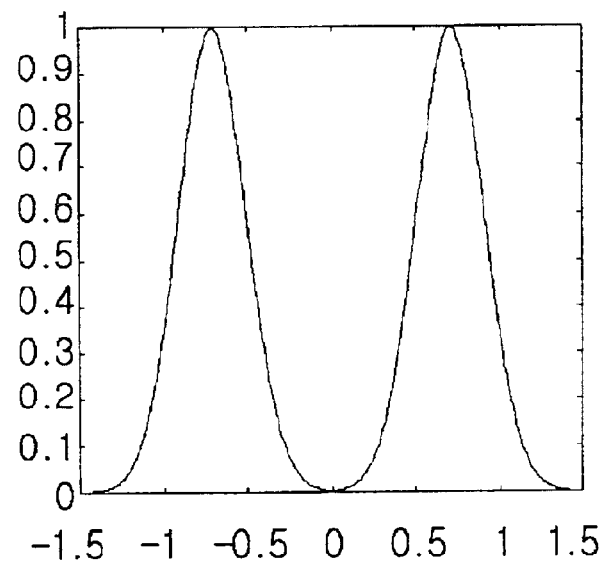
Figure 7D:
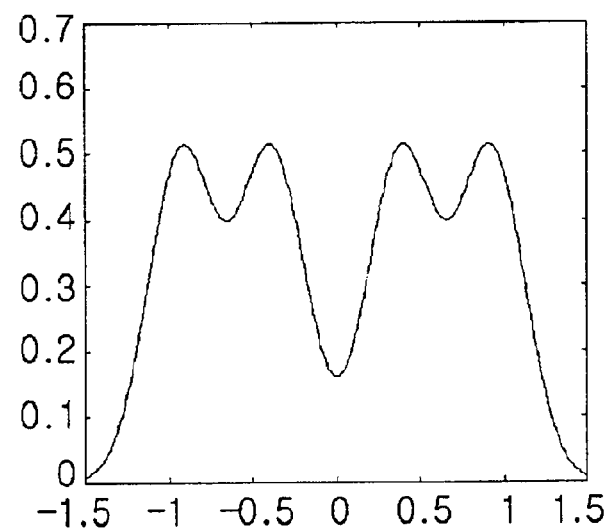

FIG. 5 shows a method for estimating the signal-to-noise (S/N) ratio of the present time point according to a preferred embodiment of the present invention. FIG. 6 shows M-ary PSK signal constellation in a noise-free channel environment.

Referring to FIGS. 5 and 6, the level of the received signal modulated by M-ary PSK method is normalized (S501). In case of a noise-free channel, M-ary PSK modulated symbol signal having symbol energy of 1 is shown in FIG. 6.

FIG. 7 shows probability density functions of M-ary PSK signal in a noisy environment. If channel noise is added to the M-ary PSK modulated symbol signal, the probability density function of either a real part or an imaginary part of a received M-ary PSK symbol is graphically represented in FIG. 7. In case of the modulation method with higher order over QPSK, the real part and the imaginary part have the same statistical characteristic, so that the real part and the imaginary part are used all to estimate the value of signal-to-noise (S/N) ratio. Then, a quantization is performed (S502) on the normalized signal of the step S501, and a histogram of the quantized values is obtained (S503). Weighting values are given to the quantized signal values of the step S502 and the weighted signal values are linearly combined (S504).

The normalization step S501 determines a normalization reference level according to a control signal indicating the modulation method of the received signal, multiplies an inverse number of the determined normalization reference level by the received signal, and thus performs normalization. The quantization step S502 and the histogram calculation step S503 obtain the absolute values of either real part or imaginary part of the received symbols, quantize the absolute values in predefined levels, observe the number of symbols included in each quantization level, and thus obtain a histogram.

Figure 8:
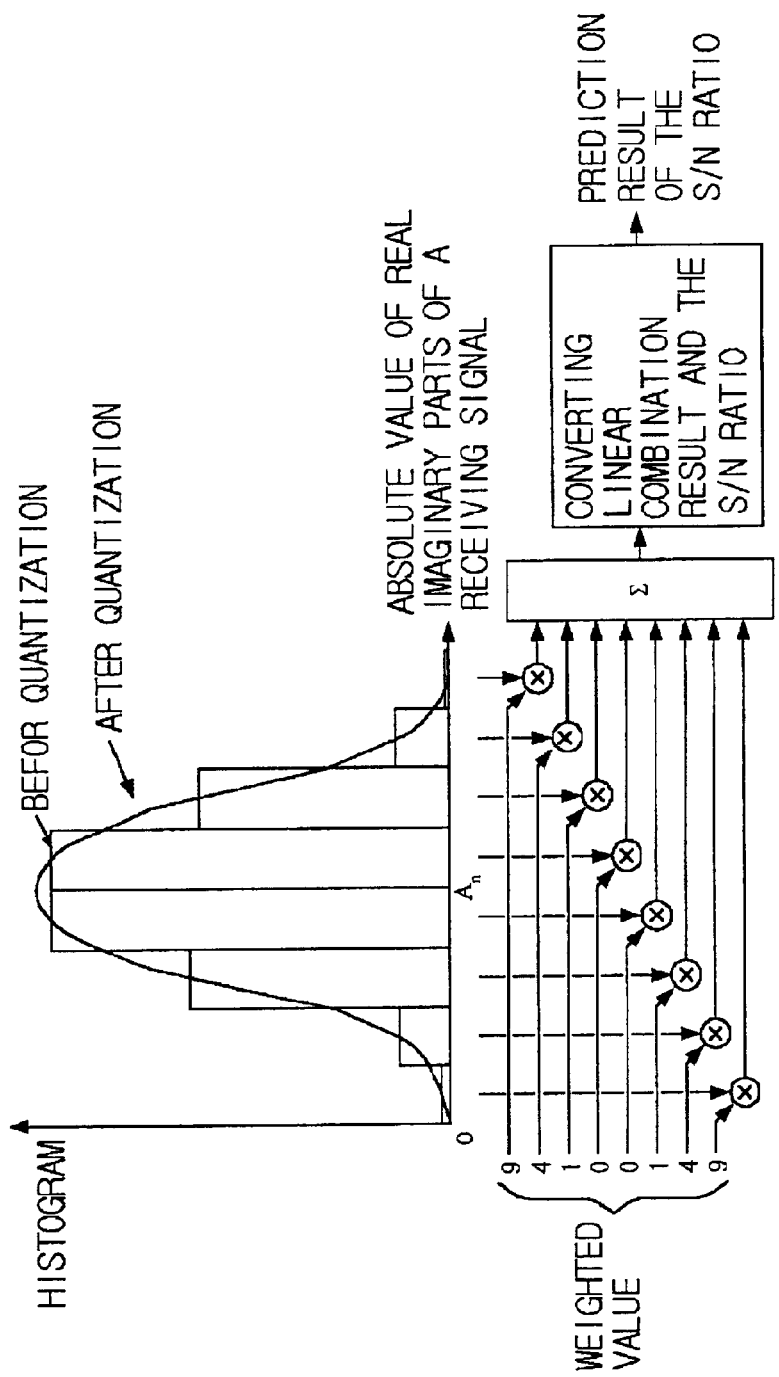
FIG. 8 shows a technique for estimating a signal-to-noise (S/N) ratio.

FIG. 8 shows an example of obtaining a histogram by using 16-level quantization on either real part or imaginary part of received M-ary PSK symbols, applying a square-type weight to this result, then combining the results linearly, and finally estimating the signal-to-noise (S/N) ratio. The weights are defined as the squared integer values in consideration of the complexity when it is implemented in hardware. Plurality of weighted values such as 0, 1, 4, and 9 et al. are symmetrically applied from the central point of quantized signal level '1'.

Figure 9A:
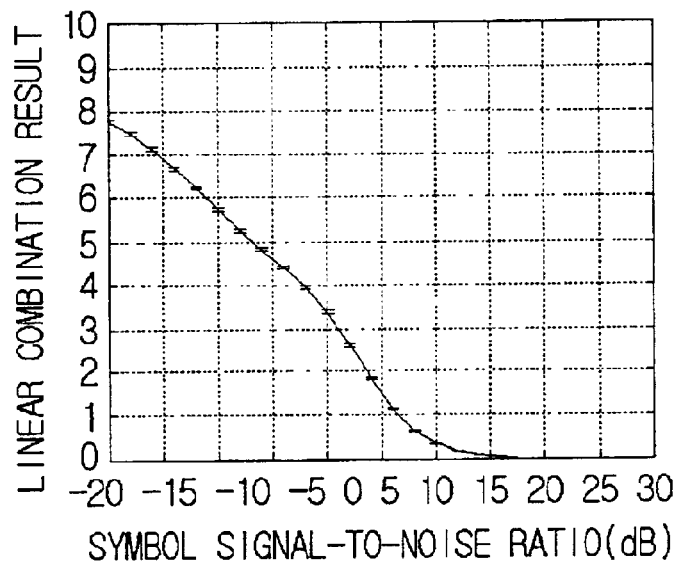
FIG. 9 shows a characteristic of linear combination results according to the histogram of the signal-to-noise (S/N) ratio used for the signal-to-noise (S/N) ratio estimation technique.
Figure 9B:
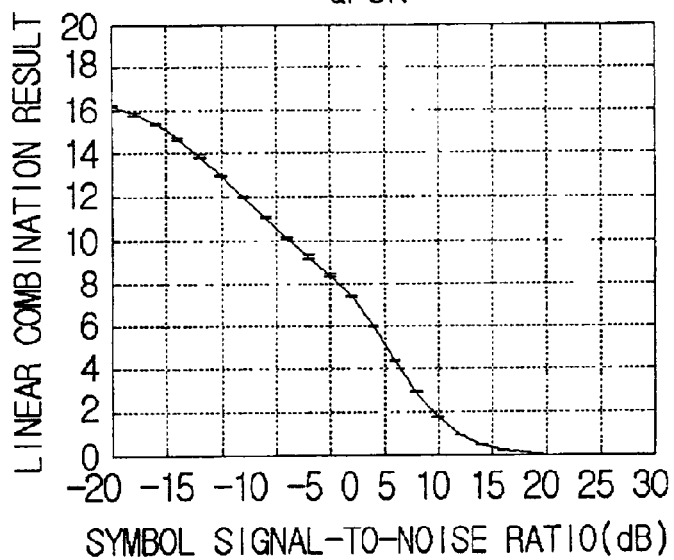
Figure 9C:
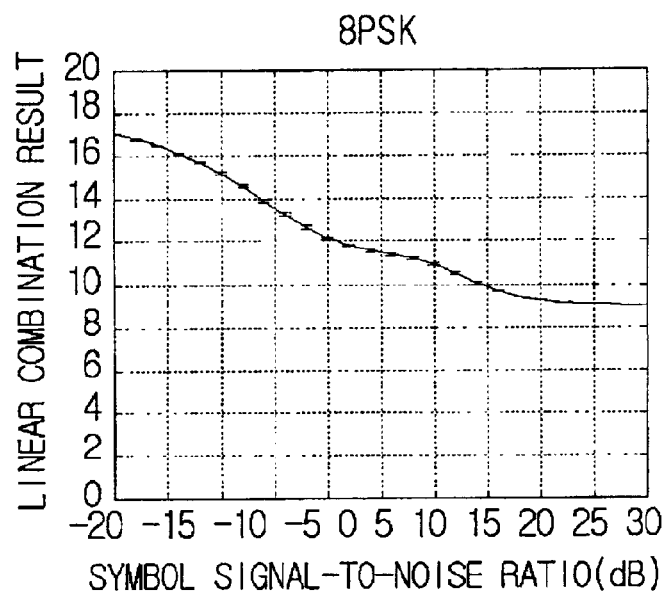

FIG. 9 shows a characteristic of a linear combination value wherein the square-type weight in the 16-level quantization is applied. In FIG. 9, a curve depicts characteristic of average value of the linear combination result, a bar graph in a vertical direction indicates a standard deviation from an average value. FIG. 9 indicates monotonically decreasing characteristics according to a received signal-to-noise (S/N) ratio. A relation between the received signal-to-noise (S/N) ratio and the linear combination result of FIG. 9 is employed to estimate a received signal-to-noise (S/N) ratio on the basis of a linear combination result obtained under a certain channel.

Then, a step for converting the obtained combination result to signal-to-noise (S/N) ratio is performed (S505). At this time, a relation between a linear combination result value shown in FIG. 9 and a received signal-to-noise (S/N) ratio obtained by a simulation is made as a relation table, and a signal-to-noise (S/N) ratio result corresponding to a linear combination result value previously estimated in a channel is outputted (S506) by using the relation table. After that, the obtained signal-to-noise (S/N) ratio estimation result is outputted (S507).

Figure 10A:
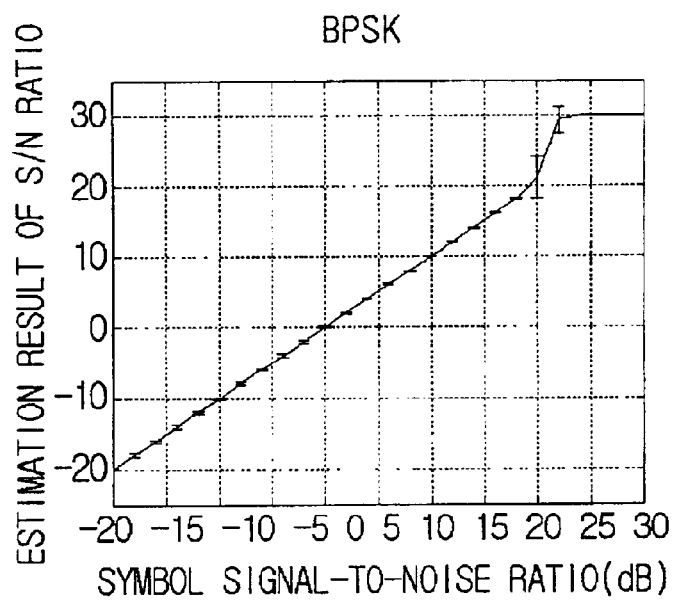
FIG. 10 shows the estimated results of the signal-to-noise (S/N) ratio.
Figure 10B:
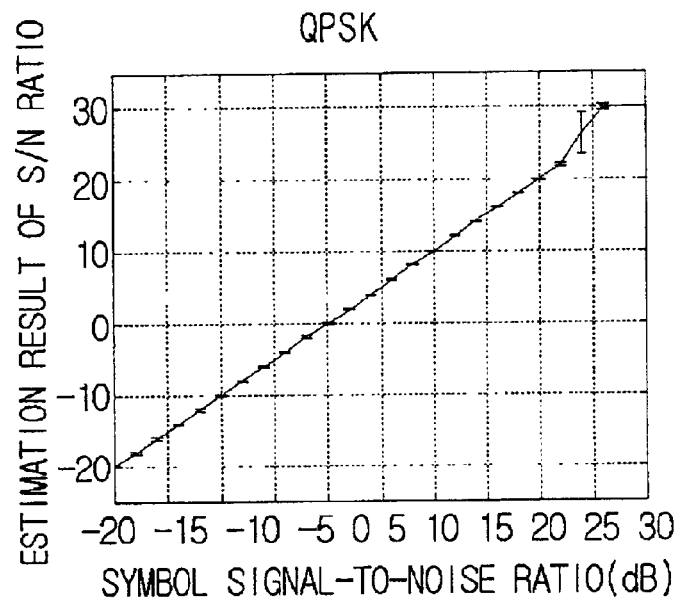
Figure 10C:
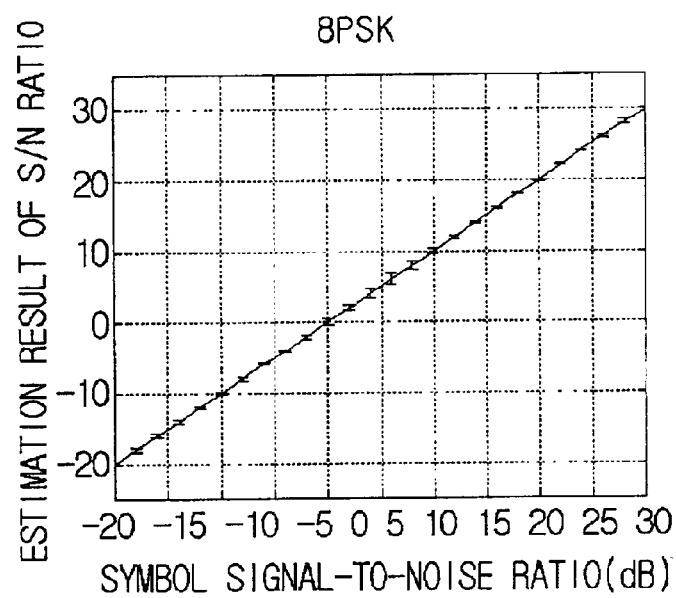

FIG. 10 is a graphical representation illustrating a performance of an estimation result of the received signal-to-noise (S/N) ratio by using the relation between the signal-to-noise (S/N) ratio and the linear combination result in FIG. 9. In FIG. 10, the curve indicates averaged values of a signal-to-noise (S/N) ratio estimation result, and the vertical bar on the curve indicates a standard deviation from the average value. From this result, the estimation of the received signal-to-noise (S/N) ratio using 16 quantization levels has an average characteristic near to a linear shape, up to about 20 dB as a maximum value. And, the standard deviation is not large.

In the meantime, a method for predicting a signal-to-noise (S/N) ratio of the next time point on the basis of signal-to-noise (S/N) ratio values previously estimated at the present and past time points is disclosed in Korean Patent Application No. 2000-4111. FIG. 11 is a flowchart illustrating a step for predicting a received signal-to-noise ratio according to a preferred embodiment of the present invention.

Referring to FIG. 11, a time t is initialized (S1101). A low pass filtering action is performed (S1103) for the estimated signal-to-noise (S/N) ratio values. On the basis of the variation of the filtered signal-to-noise (S/N) ratio values, a signal-to-noise (S/N) ratio at the next time point are predicted (S1104). The low pass filtering (LPF) action is employed to eliminate a fast variation in the estimated signal-to-noise (S/N) ratio values, wherein the magnitude is changed at an interval shorter than a response delay time of a system. Such a LPF action is used to eliminate a high-speed variation in signal-to-noise (S/N) ratio values, but causes a delayed variation of the estimated values. Accordingly, in order to reduce a delay error caused by the low pass filter (LPF), an prediction error correction step (S1105) is performed, wherein a correction value is proportional to the average prediction error.

Since the variation of signal-to-noise (S/N) ratio faster than a system response time within a smaller width is not considered in the prediction step, real signal-to-noise (S/N) ratio is deviated from the predicted value within a small range due to scintillation. At this time, if the real signal-to-noise (S/N) ratio value is higher than the predicted value, a deterioration of service quality does not occur. However, in the opposite case that the real signal-to-noise (S/N) ratio is lower than the predicted value, a transmission method conversion proper to the real value may be not made or a transmission power may be adjusted with a magnitude smaller than a required magnitude, thereby a deterioration of service quality can occur. In order to prevent this case, a method making the predicted value lower than the real value is also needed. The present invention employs a method for adding a margin to the predicted value, wherein a fixed margin having a predetermined negative (−) magnitude is added to the predicted value and a variable margin estimated in proportion to a standard deviation of the prediction error in step S1106 is also added in step S1107.

More specifically, the step S1104 for prediction a signal-to-noise (S/N) ratio of the next time point on the basis of a variation of the Low-Pass-Filtered signal-to-noise (S/N) ratio is employed to predict a magnitude of the signal-to-noise (S/N) ratio after a predetermined time, on the basis of a variation of a predetermined degree for a difference between a received signal-to-noise (S/N) ratio at the past time point and a received signal-to-noise (S/N) ratio at the present time point.

The prediction error correction step S1105 delays the predicted signal-to-noise (S/N) ratio by an prediction time, obtains an prediction error by calculating a difference between a real received signal-to-noise (S/N) ratio before the low pass filtering and the delayed signal-to-noise (S/N) ratio, estimates an average value of the prediction errors, and finally corrects the predicted signal-to-noise (S/N) ratio to be proportional to the average prediction error. Herein, the average value of the prediction errors is obtained by a low pass filtering, such as a discrete-time feedback filtering, on the prediction error.

A step S1107 for allocating a prediction margin estimates a standard deviation of the prediction error, calculates a variable prediction margin proportional to the standard deviation, and adds the variable prediction margin and a fixed prediction margin of a predetermined size to a prediction value. Here, the dispersion of the prediction error is obtained by a low pass filtering, such as a discrete-time feedback filtering, on the prediction error and the average prediction error. In addition, the variable prediction margin is estimated by using a constant proportional to a difference between a time rate and a required probability, the time rate causing a negative (−) prediction error until the present time point.

Figure 12:
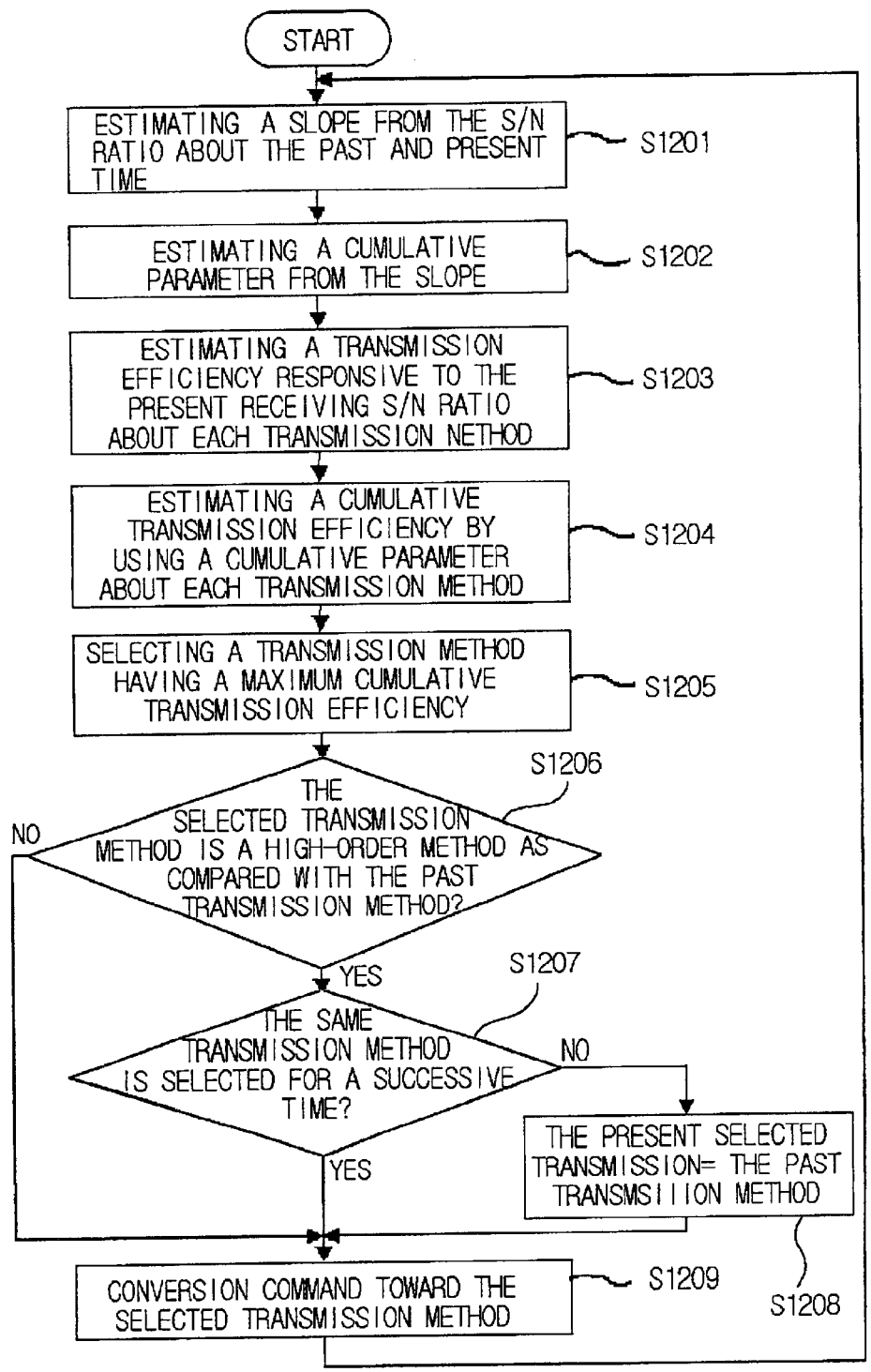
FIG. 12 is a flowchart illustrating a step for determining a transmission method shown in FIG. 4.

In the meantime, a method for determining a transmission method in a rain attenuation compensation method using the adaptive transmission techniques is disclosed in Korean Patent Application No. 1999-61842. FIG. 12 is a flowchart illustrating a method for determining a transmission method according to a preferred embodiment of the present invention.

Referring to FIG. 12, steps S1201 and S1202 are provided to calculate a cumulative value of transmission efficiencies estimated by the past signal-to-noise (S/N) ratio. If a variation of a received signal is at a high value, an accumulation parameter is reduced to give more importance on the present transmission efficiency rather than the past transmission efficiency. On the contrary, if a variation of a received signal is at a low value, the accumulation parameter is increased to reflect the past transmission efficiency.

For this purpose, a slope $\Delta R(t)$ on the past and present received signal-to-noise (S/N) ratio values is obtained by using a mathematical equation 1.

$$\Delta R(t) = \frac{R(t) - R(t-1)}{t - (t-1)} = R(t) - R(t-1) \quad \text{[Equation 1]}$$

In the Equation 1, R(t) is a received signal-to-noise (S/N) ratio measured at the present time point, R(t−1) is the past signal-to-noise (S/N) ratio prior to R(t), and t is a sampling time and an integer indicated as either '0' or positive integer. By using the aforementioned instantaneous slope $\Delta R(t)$, a accumulation parameter $\lambda$ of the present time point is obtained by a mathematical equation 2.

$$\lambda = \frac{1}{x|\Delta R(t)| + 1} \quad \text{[Equation 2]}$$

In the Equation 2, x is a constant being a positive(+) real number, and is employed to adjust the accumulation parameter value according to the slope. If a small number below 0.5 is selected as a value of x, the accumulation parameter $\lambda$ is less sensitive to a variation of a slope magnitude. If a number near to 1 is selected as a value of x, the past transmission efficiency has more importance. If the value of x increases, the accumulation parameter $\lambda$ becomes more sensitive to a slope. If a number near to 1 is selected as a value of x, the accumulation parameter $\lambda$ becomes very sensitive to a value in the vicinity of a slope 1. In addition, if the value of x is over 1, the accumulation parameter $\lambda$ is less sensitive to a slope variation, but an importance about the past transmission efficiency is reduced in contrary to the above case that a small number below 1 is selected as a value of x.

A step S1203 is provided to estimate the transmission efficiency about each of N transmission methods according to signal-to-noise (S/N) ratio values. Here, the transmission efficiency S(t) is defined as a bit rate that is successfully received without an error as shown in a mathematical equation 3.

$$S(t) = (1 - P_b(R,D))R_b(D) \quad \text{[Equation 3]}$$

In the Equation 3, $P_b(R,D)$ indicates a bit error rate (BER) of a transmission method D, has a different value according to the signal-to-noise (S/N) ratio R and a transmission method D, and $R_b(D)$ indicates a transmission bit rate when a communication service is made with the transmission method D.

For a relative comparison of each transmission method, the present invention uses a transmission efficiency normalized by the transmission bit rate $R_b(D)$ of each transmission method.

Further, a bit error rate (BER) of a transmission method having a higher BER as compared with a specific bit error rate (BER) $P_b^*$ required by a communication service is determined as a constant P (for example, a number 1) near to the number '1', so that the transmission efficiency not satisfying a service quality becomes reduced to a very small number. Transmission efficiency of each transmission method is obtained by a mathematical equation 4.

$$S(t) = \begin{cases} 1 - P_b(R, D), & \text{if } P_b(R, D) \le P_b^* \\ 1 - P, & \text{if } P_b = (R, D) \rangle P_b^* \end{cases} \quad \text{[Equation 4]}$$

Then, a step S1204 is provided to calculate a cumulative transmission efficiency of each transmission method by using the accumulation parameter $\lambda$ calculated by the Equation 2.

The cumulative transmission efficiency $\overline{S}(t)$ is obtained by a mathematical equation 5

$$\overline{S}(t) = \sum_{l=0}^{L-1} \lambda^l S(t-l) \quad \text{[Equation 5]}$$

In the Equation 5, the cumulative transmission efficiency $\overline{S}(t)$ is the sum of transmission efficiencies exponentially weighted by the accumulation parameter $\lambda$ during the predetermined period L.

A step S1205 is provided to select a transmission method of which the cumulative transmission efficiency has a maximum value.

Then, a step S1206 is employed to determine whether the selected transmission method is a higher-priority method or a lower-priority method as compared to the past transmission method. In case of the lower-priority method, a step S1209 for transmitting a command to both a transmission part and a receiving part is performed so that a switching toward the selected transmission method occurs.

On the contrary, if the selected transmission method is a higher-priority method as compared to the past transmission method, in order to determine whether the present selection is a stable or not, a step S1207 is employed to check whether the same transmission method is selected during a specific time period. In case that the same selection is successively made during the specific time, a switching toward the present selected transmission method is commanded by a step S1209. If not, the past transmission method is maintained without a switching command and an unnecessary switching is avoided in a step S1208.

As described above, according to the present invention, a rain attenuation compensation method and an apparatus using the same are provided to effectively compensate a signal attenuation caused by a rain in a satellite communication system using a high frequency band over Ku-band. The inventive method and apparatus have a real-time adaptability, directly estimate a signal-to-noise (S/N) ratio not a receiving signal level, and thus effectively allocate more accurate adaptive transmission method. In the light of a prediction technique, the present invention can be simply embodied by a simple process on the basis of the variation of the filtered signal-to-noise (S/N) ratio values. Besides, in case of selecting a transmission method, the present invention can avoid frequently switching the transmission method.

In particular, in case that a switching from a low-priority transmission method to a high-priority transmission method is requested, the present invention delays the switching until the request is sustained, thereby preventing the deterioration of transmission efficiency and service quality deterioration. In addition, the present invention achieves a self-efficiency of a transmission method such as an adaptive coding method using a block turbo code, thereby making more economical service.

Although representative embodiments of the present invention have been disclosed for illustrative purposes, those who are skilled in the art will appreciate that various modifications, additions and substitutions are possible without departing from the scope and spirit of the present invention as defined in the accompanying claims and the equivalents thereof.

What we claim:

1. A rain attenuation compensation method using adaptive transmission technique in a satellite communication system including a transmission end using a plurality of transmission methods combining an adaptive coding method and an adaptive modulation method, a receiving end using a plurality of receiving methods combining an adaptive decoding method and an adaptive demodulation method, and a controller for estimating/predicting signal-to-noise (S/N) ratio and controlling both the transmission method and transmission power of the transmission end and the receiving method of the receiving end, characterized in that the controller performs a rain attenuation compensation comprising the steps of:

estimating a signal-to-noise (S/N) ratio of present time point, and predicting a signal-to-noise (S/N) ratio of the next time point;

determining a transmission method which is adequate to the predicted signal-to-noise (S/N) ratio of the next time point; and generating a control signal for requesting the change of the transmission method and transmission power of the transmission end and the receiving method of the receiving end according to the determined transmission method, and transmitting/receiving a data through the changed transmission method.

2. The rain attenuation compensation method using adaptive transmission technique according to claim 1 wherein the step of estimating the signal-to-noise (S/N) ratio of the present time point in the step of predicting the signal-to-noise (S/N) ratio comprises the steps of:

performing a normalization according to the modulation method of received symbols;

obtaining a histogram of the normalized symbol values;

obtaining linear combination result by applying a square-type weights on the histogram; and estimating the received signal-to-noise (S/N) ratio from the linear combination result.

3. The rain attenuation compensation method using adaptive transmission technique according to claim 2 wherein the step of performing the normalization comprises the steps of:

determining a normalization reference level according to a control signal indicating the modulation method of a received signal; and multiplying an inverse number of the normalization reference level by the received signal, and performing a normalization.

4. The rain attenuation compensation method using adaptive transmission technique according to claim 2 wherein the step of obtaining the histogram comprises the steps of:

calculating an absolute value of the real part or the imaginary part of the received symbols;

performing quantization operations with a predetermined quantization levels; and observing the number of symbols included in each quantization level, and estimating the histogram.

5. The rain attenuation compensation method using adaptive transmission technique according to claim 2 wherein the step obtaining the linear combination result comprises the steps of:

symmetrically multiplying the symbol values by weights of squared integers such as 0, 1, 4, and 9 et al. with the normalized symbol level in the center; and adding all of the results obtained by multiplying the weight values, and thus calculating the linearly combined value.

6. The rain attenuation compensation method using adaptive transmission technique according to claim 2 wherein the step of estimating the received signal-to-noise (S/N) ratio comprises the steps of:

making a table for representing the relationship between the linear combination result value and the received signal-to-noise (S/N) ratio obtained by simulation; and estimating the received signal-to-noise (S/N) ratio on the basis of a linear combination result value calculated with respect to a channel by using the relation table.

7. The rain attenuation compensation method using adaptive transmission technique according to claim 1 wherein the step of predicting the signal-to-noise (S/N) ratio at the next time point comprises the steps of:

performing a low-pass-filtering for removing high-speed variation of the magnitude of the estimated signal-to-noise (S/N) ratio;

predicting the magnitude of the signal-to-noise (S/N) ratio after a predetermined time on the basis of the variation of the low-pass-filtered signal-to-noise (S/N) ratio;

estimating an average prediction error of the predicted value;

correcting an prediction error of the predicted signal-to-noise (S/N) ratio; and allocating an prediction margin to the prediction value for which the prediction error is corrected.

8. The rain attenuation compensation method using adaptive transmission technique according to claim 7 wherein:

the step of predicting the signal-to-noise (S/N) ratio predicts the magnitude of a signal-to-noise (S/N) ratio after a predetermined time from the variation amount of a predetermined degree for a difference between the received signal-to-noise (S/N) ratio at the past time point and the received signal-to-noise (S/N) ratio at the present time point.

9. The rain attenuation compensation method using adaptive transmission technique according to claim 7 wherein the step of correcting the prediction error of the predicted signal-to-noise (S/N) ratio comprises the steps of:

delaying the predicted signal-to-noise (S/N) ratio by an predetermined prediction time;

estimating the difference between a real received signal-to-noise (S/N) ratio before the low pass filtering and the delayed signal-to-noise (S/N) ratio, and obtaining the prediction error;

estimating an average prediction error; and correcting the predicted value of signal-to-noise (S/N) ratio by adding a correction value proportional to the average prediction error.

10. The rain attenuation compensation method using adaptive transmission technique according to claim 9 wherein:

the step of estimating the average prediction error obtains the average prediction error by applying a discrete-time feedback filtering on the prediction error.

11. The rain attenuation compensation method using adaptive transmission technique according to claim 7 wherein the step of allocating the prediction margin comprises the steps of:

estimating a standard deviation of prediction error on the basis of the prediction error and the average prediction error;

estimating a variable prediction margin to be proportional to the standard deviation; and adding both the variable prediction margin and a predetermined fixed prediction margin to the predicted and corrected signal-to-noise (S/N) ratio.

12. The rain attenuation compensation method using adaptive transmission technique according to claim 11 wherein:

the step of estimating the standard deviation of prediction error obtains a standard deviation of an prediction error by applying a discrete-time feedback filtering on the difference between the prediction error and the average prediction error.

13. The rain attenuation compensation method using adaptive transmission technique according to claim 11 wherein:

the step of estimating the variable prediction margin obtains the variable prediction margin by using a constant proportional to a difference between a time rate and a required probability, the time rate causing a negative (−) prediction error until a present time point.

14. The rain attenuation compensation method using adaptive transmission technique according to claim 1 wherein the step of determining the transmission method comprises the steps of:

estimating a slope from the signal-to-noise (S/N) ratio values at the past and present time points, and estimating a accumulation parameter for adjusting a accumulation weighting value according to the slope;

estimating transmission efficiency of the present signal-to-noise(S/N) ratio for each transmission method;

estimating a cumulative transmission efficiency by using the calculated transmission efficiency and the accumulation parameter for each transmission method; and selecting a transmission method having the maximum cumulative transmission efficiency, determining whether the selection is stable or not, and determining a switching toward the selected transmission method according to the determined result.

15. The rain attenuation compensation method using adaptive transmission technique according to claim 1 wherein:

the transmission method is an adaptive transmission method comprising an adaptive coding using a block turbo code and an adaptive modulation using M-ary PSK modulation.

16. The rain attenuation compensation method using adaptive transmission technique according to claim 15 wherein the adaptive coding using the block turbo code constructs an information frame having $k^2$ bits in order to employ (n,k) linear block code wherein a length of information word is 'k' and a length of a code word is 'n', whereby in a normal case, the transmission end performs k-times block coding operations with respect to k information bits and transmits a coding frame having nk bits; and the receiving end sequentially performs soft decision Viterbi decoding operation for k times as to n received signals at a time with respect to nk received signals, thereby restoring a plurality of information frames of $k^2$; and if it is determined that an additional coding gain is needed because of an excessive attenuation, the transmission end performs block coding operations for k times for each row and column as to k information bits and transmits coding frames having $(2nk-k^2)$ bits; and the receiving end performs iterative decoding operations by using a soft decision output Viterbi algorithm about a received coding frame having $(2nk-k^2)$ bits, thereby restoring a plurality of information frames of $k^2$.

17. The rain attenuation compensation method using adaptive transmission technique according to claim 14 wherein:

the transmission efficiency is estimated by using a predetermined required signal-to-noise (S/N) ratio value for each transmission method.

18. The rain attenuation compensation method using adaptive transmission technique according to claim 14 wherein the step of estimating the cumulative parameter comprises the steps of:

estimating a slope on the basis of a difference between the past signal-to-noise (S/N) ratio and the present received signal-to-noise (S/N) ratio;

updating the present signal-to-noise (S/N) ratio to the past signal-to-noise (S/N) ratio, and recording the updated signal-to-noise (S/N) ratio; and estimating the accumulation parameter from the slope, to be inversely proportional to the slope.

19. The rain attenuation compensation method using adaptive transmission technique according to claim 14 wherein the step of determining a conversion toward the selected transmission method comprises the steps of:

selecting a transmission method having a maximum transmission efficiency among the cumulative transmission efficiencies;

determining whether or not the selected transmission method is one with higher priority than that of the past transmission method; and performing a switching toward the selected transmission method when the selected transmission method does not have a higher-priority, and if the determined method has a higher priority, performing a switching toward the selected transmission method when the same selection is made for a continued period of time.

20. A recording media readable by a computer containing a program therein, the program makes the computer to perform the steps of:

estimating a signal-to-noise (S/N) ratio of a preset time point, and predicting a signal-to-noise (S/N) ratio of the next time point;

determining which of transmission methods is adequate to the predicted signal-to-noise (S/N) ratio of the next time point; and generating a control signal for inquiring the change of the transmission method and transmission power of the transmission end and the receiving method of the receiving end according to the determined transmission method, and transmitting/receiving a data through the changed transmission method.

21. A satellite communication system comprising:

a transmission end comprising a plurality of transmission methods composed of the combination of an adaptive coding and an adaptive modulation;

a receiving end comprising a plurality of receiving methods composed of a combination of an adaptive decoding and an adaptive demodulation; and a controller which estimates a signal-to-noise (S/N) ratio of the signal received at the receiving end, predicts a signal-to-noise (S/N) ratio at the next time point, determines which of transmission methods is adequate to the predicted signal-to-noise (S/N) ratio of the next time point, controls both the transmission method and transmission power of the transmission end and the receiving method of the receiving end so as to allow the transmission end and the receiving end to transmit/receive the data through the determined transmission method, and adaptively controls the transmission method according to the signal-to-noise (S/N) ratio.

* * * * *